US011807094B1

(12) United States Patent
Cattoor et al.

(10) Patent No.: US 11,807,094 B1
(45) Date of Patent: Nov. 7, 2023

(54) ELECTRIC DRIVE UNIT WITH PLANETARY TWO-SPEED POWERSHIFT TRANSMISSION DRIVEN BY THREE ELECTRIC MOTORS

(71) Applicant: Dana Belgium N.V., Flanders (BE)

(72) Inventors: Kurt Cattoor, Koolkerke (BE); Filip D. Schacht, Meulebeke (BE); Filip Van Raepenbusch, Bruges (BE); Joachim Van Dingenen, Drongen (BE); Jan Markey, Wingene (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 18/074,293

(22) Filed: Dec. 2, 2022

(51) Int. Cl.
*B60K 17/08* (2006.01)
*B60K 1/02* (2006.01)

(52) U.S. Cl.
CPC ............... *B60K 17/08* (2013.01); *B60K 1/02* (2013.01)

(58) Field of Classification Search
CPC .. B60K 2001/0405; B60K 17/08; B60K 1/02; F16H 2003/0938; F16H 3/005
See application file for complete search history.

(56) References Cited

U.S. PATENT DOCUMENTS

| 10,723,211 | B2 | 7/2020 | Mastrandrea | |
| 11,220,171 | B2* | 1/2022 | Weeramantry | B60K 6/387 |
| 11,247,555 | B2 | 2/2022 | Park et al. | |
| 11,480,238 | B1 | 10/2022 | Profumo et al. | |
| 2008/0182694 | A1* | 7/2008 | Holmes | B60K 6/365 475/5 |
| 2009/0200095 | A1* | 8/2009 | Kawasaki | B60W 10/107 180/65.265 |
| 2010/0062891 | A1* | 3/2010 | Ekonen | B60K 23/0808 74/405 |
| 2021/0053434 | A1* | 2/2021 | Hao | B60K 6/36 |
| 2021/0086607 | A1* | 3/2021 | Schneidewind | B60K 6/445 |
| 2021/0354550 | A1* | 11/2021 | Kaltenbach | F16H 3/725 |
| 2022/0332183 | A1 | 10/2022 | Duan | |

* cited by examiner

*Primary Examiner* — Stacey A Fluhart
*Assistant Examiner* — Farhana Pervin
(74) *Attorney, Agent, or Firm* — McCoy Russell LLP

(57) ABSTRACT

Systems and methods for an electric drive unit are provided. A transmission system in an electric drive unit includes first, second, and third input shafts rotationally coupled to first, second, and third electric machines, respectively, wherein the first and third electric machines are arranged on a first side of the transmission and the second electric machine is arranged on a second opposing side of the transmission. The transmission system further includes an idler shaft that connects the first, second, and third electric machines and couples to a sun gear of a planetary gear set. The planetary gear set is arranged between a first and second clutch wherein the first clutch couples to a carrier and the second clutch couples to a ring gear. An output shaft is spaced away from the planetary gear set via gear and includes two flanges to couple the transmission to outputs.

18 Claims, 6 Drawing Sheets

ELECTRIC DRIVE UNIT WITH PLANETARY TWO-SPEED POWERSHIFT TRANSMISSION DRIVEN BY THREE ELECTRIC MOTORS

TECHNICAL FIELD

The present disclosure relates to a multi-speed transmission system in an electric drive unit and a transmission shifting method.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Certain electric drive units have used planetary gear sets to achieve gear reduction and drive unit profile targets. Further, dual-motors have been utilized in some electric drive units to increase the drive unit's power output and control adaptability.

Some examples of such electric drive units of electric vehicles include a dual-motor drive unit where the motors are coaxially arranged as well as an output shaft that includes a multitude of gears positioned thereon. Additionally, some examples of such electric drive units may include a countershaft transmission as opposed to a planetary transmission. Countershaft transmissions may provide lower efficiency and a lower torque-to-weight ratio compared with planetary transmissions.

The inventors herein have recognized several drawbacks to such electric drive units. For instance, including multiple gears on the output shaft increases the width of the transmission which may pose barriers to integration in certain vehicle platforms. Further, some previous electric drive units have a drop that may be incompatible in certain vehicles that demand longer drops due to the packaging demands of surrounding vehicle systems. For example, previous electric drive units may be incompatible with certain vehicles such as all-wheel drive loaders. Further due to the layout of clutches and associated gear reductions on downstream shafts included in previous electric drive units, the unit's width may not meet packaging demands of some vehicles. Other dual-motor electric drives have been unable to achieve desired sizing constraints, specifically with regard to drop and width, for some vehicle types.

The inventors herein have recognized the aforementioned issues and developed a transmission system in an electric drive unit that at least partially addresses these issues. The transmission system, in one example, includes three electric motors as part of the electric drive unit. The addition of a third electric motor may provide enough tractive effort at stall to load a bucket of a loader type vehicle and to provide enough top speed and speed on ramp. A first and second electric motor may be arranged on opposite sides of the transmission with a third electric motor arranged on the same side of the transmission as the first motor. A layout with these three electric motors as inputs may allow for selection of the electric motors even if high total power for the transmission is required. The electric motors may be small in order to reduce cost.

The transmission system includes a planetary gear set arranged between a first clutch and a second clutch where the first clutch is coupled to a carrier of the planetary gear set via a gear and the second clutch grounds a ring gear of the planetary gear set. The planetary gear set may increase efficiency and torque-to-weight ratio as compared to a countershaft transmission. The first, second, and third electric motors are connected via an idler shaft and the idler shaft is also directly coupled to a sun gear of the planetary gear set and to the first clutch. Further, the first clutch and second clutch are configured to shift the transmission system between multiple gear ratios and deliver mechanical power to an output shaft that is spaced away from the planetary gear set. In this way, the transmission system achieves a desired width and drop that facilitates efficient integration of the system into desired vehicle platforms. For instance, the transmission system may be efficiently incorporated into an installation envelope of a loader or other suitable type of vehicle.

Further, in one example, the first clutch may be configured to, when engaged, engage the idler shaft to which it is coupled. Still further in such an example, the second clutch may be configured to, when engaged, ground the ring gear to which it is coupled. Arranging the first and second clutches on opposing sides of the planetary gear set allows the transmission to be compactly packaged while allowing a long drop as the output shaft is spaced away from the planetary gear set and clutches. The output shaft may incorporate a single gear which couples the output shaft to the planetary gear set via the gear coupled to the carrier. The output shaft may further incorporate two flanges and two bearings and as such a distance between the flanges may be minimized in order to allow the transmission to be efficiently incorporated into an installation envelope of a loader or other suitable type of vehicle that demands a short flange-to-flange distance.

The first and second clutches may be wet friction clutches, in one example. In this way, the transmission is capable of efficiently powershifting between multiple operating gears. Power interruptions during shifting transients may therefore be reduced (e.g., avoided), thereby enhancing transmission performance and customer appeal.

In some embodiments, the transmission system may further include application of a dry sump to reduce splash losses. As such, a lowest point of the transmission housing may be continuously emptied by a scavenger pump.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
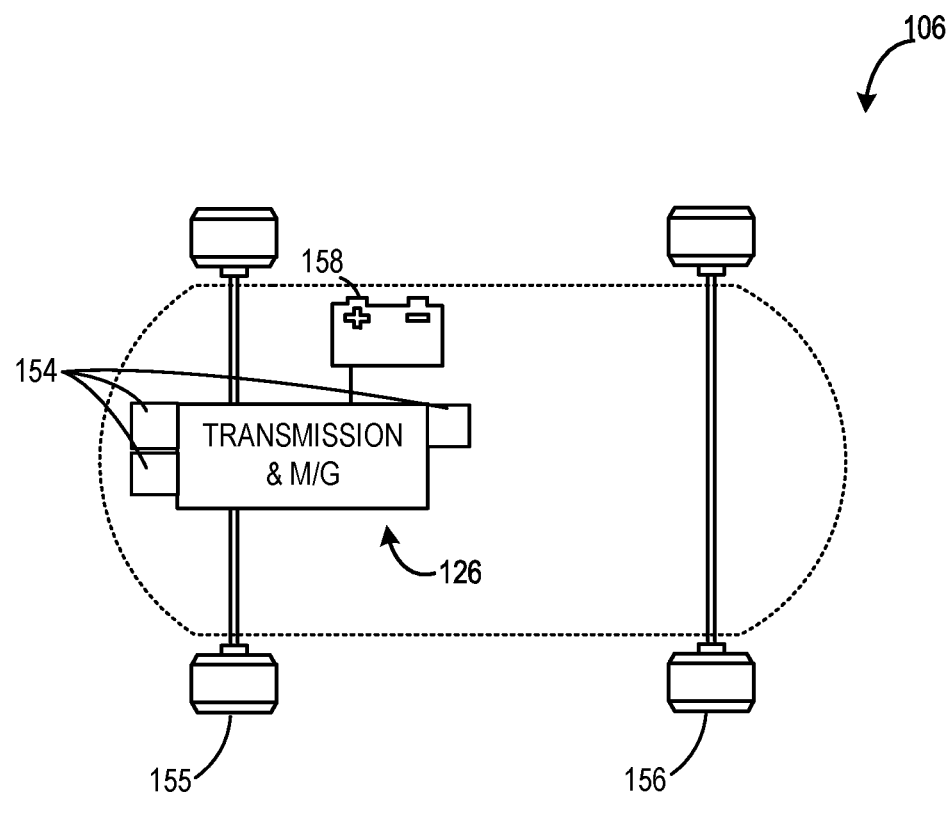
FIG. 1 shows a schematic diagram of an electric vehicle including a transmission system.
Figure 1:
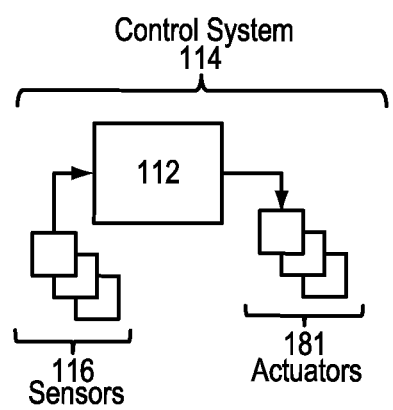

The following description relates to systems and methods for a planetary two-speed powershift transmission for an electric vehicle comprising three electric motors. The transmission system includes a plurality of shafts and gears, including an idler gear that connects the three motors. A planetary gear set is arranged between a first friction clutch and a second friction clutch wherein the first friction clutch couples to a carrier of the planetary gear set and the second friction clutch couples to a ring gear of the planetary gear set. An output shaft is rotationally coupled to a gear that couples to the carrier and the output shaft is spaced away from the other components of the transmission, providing a drop specified for packaging shape and size. The output shaft includes a flange on either side and two bearings on opposing sides of the shaft, the distance between the two flanges is configured for a particular envelope of a desired vehicle platform. An exemplary electric vehicle is shown in FIG. 1. An exemplary embodiment of the layout of the two-speed planetary transmission is depicted in a stick diagram in FIG. 2A and configurations of the clutches in each operating gear is presented in a table in FIG. 2B. Example illustrations drawn to scale of the transmission system are shown in FIGS. 3A-3C. A method of operation of the transmission system is shown in a flow chart in FIG. 4. A use-case transmission control strategy is depicted in timing diagrams in FIG. 5.

FIG. 1 is a schematic drawing that depicts an electric vehicle 106 with an electric drive unit that generates motive power for vehicle propulsion. The electric vehicle 106 may be a light, medium, or heavy duty vehicle. Specifically, in one use-case example, the vehicle may be a loader type vehicle with a bucket (not pictured) that is designed to scoop loose material in industrial, agricultural, or construction environments. However, in other examples, the electric vehicle 106 may be a passenger vehicle such as a truck, sedan, wagon, and the like. Further, the electric vehicle 106 may be a battery electric vehicle (BEV), in one example, or a hybrid electric vehicle (HEV) that includes an internal combustion engine, in another example.

In one embodiment, the electric vehicle 106 may include an electric drive unit 126. Electric drive unit 126 comprises one or more electric motors 154. Electric motors 154 may be traction motors. Electric motors 154 may receive electrical power from a traction battery 158 to provide torque to rear vehicle wheels 155. Electric motors 154 may also be operated as a generator to provide electrical power to charge traction battery 158, for example, during a braking operation. It should be appreciated that while FIG. 1 depicts three electric motors, other configurations are possible that include more or less electric motors. Additionally, it should be appreciated that while FIG. 1 depicts electric motors 154 mounted in a rear wheel drive configuration, other configurations are possible, such as employing electric motor 154 in a front wheel configuration, or in a configuration in which there is one or more electric motors mounted to both the rear vehicle wheels 155 and front vehicle wheels 156.

Electric motors 154 may be coupled to an outside of a transmission/gearbox housing. The transmission/gearbox housing may house a transmission system. The transmission system may include at least one clutch and a planetary gear set. A controller 112 may send a signal to an actuator of the clutch(es) to engage or disengage the clutch(es), so as to couple or decouple power transmission from the electric motor 154 to the rear vehicle wheels 155 or the front vehicle wheels 156. Additionally or alternatively, there may be multiple traction batteries configured to provide power to different driven wheels, wherein power to the wheels may be predicated based on traction at the wheels, driver demand, and other conditions. In one example, the electric vehicle 106 includes a two-speed schematic wherein powershifting is possible.

Controller 112 may form a portion of a control system 114. Controller 112 may include a microcomputer with components such as a processor (e.g., a microprocessor unit), input/output ports, an electronic storage medium for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed. Control system 114 is shown receiving information from a plurality of sensors 116 and sending control signals to a plurality of actuators 181. For example, the sensors 116 may include a pedal position sensor designed to detect a depression of an operator-actuated pedal such as an accelerator pedal and/or brake pedal, a speed sensor at the transmission output shaft, energy storage device state of chart (SOC) sensor, clutch position sensors, and the like. Motor speed may be ascertained from the amount of power sent from an inverter to an electric machine. An input device (e.g., accelerator pedal, brake pedal, drive mode selector, combinations thereof, and the like) may further provide input signals indicative of an operator's intent for vehicle control. As another example, the actuators may include the clutch, etc.

Upon receiving the signals from the various sensors 116 of FIG. 1, the controller 112 processes the received signals and employs various actuators 181 of vehicle components to adjust the components based on the received signals and instructions stored on the memory of controller 112. For example, the controller 112 may receive an accelerator pedal signal indicative of an operator's request for increased vehicle acceleration. In response, the controller 112 may command operation of inverters to adjust electric machine power output and increase power delivered from the electric machine(s) to the transmission. The controller 112 may, during certain operating conditions, be designed to send commands to clutches to engage and disengage the clutches. For instance, a control command may be sent to a clutch and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

Figures 2A, 2B:
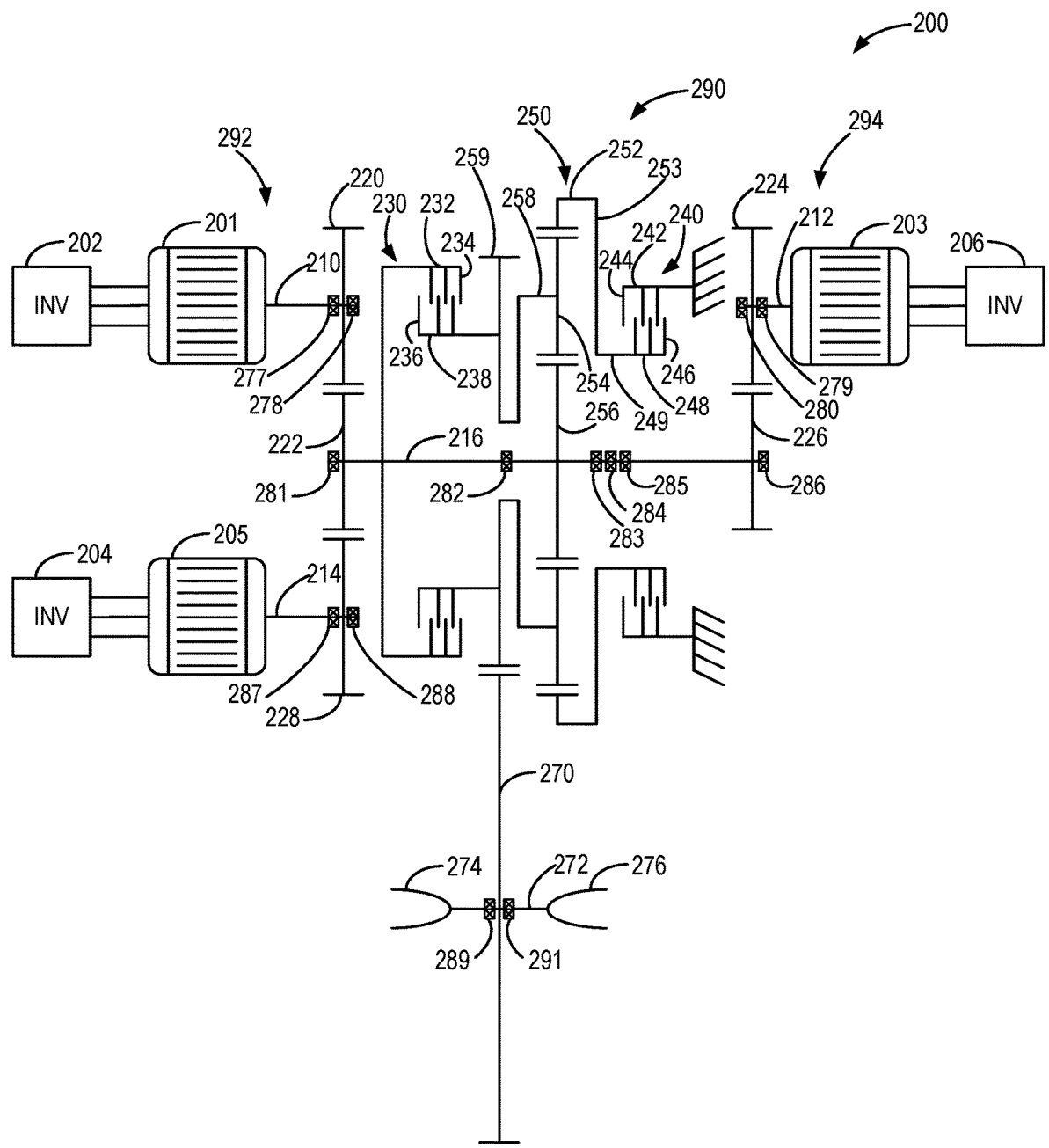
FIG. 2A shows a stick diagram of an exemplary transmission system.
FIG. 2B shows a table indicating configurations of clutches in operating gears of the transmission.
Figure 3A:
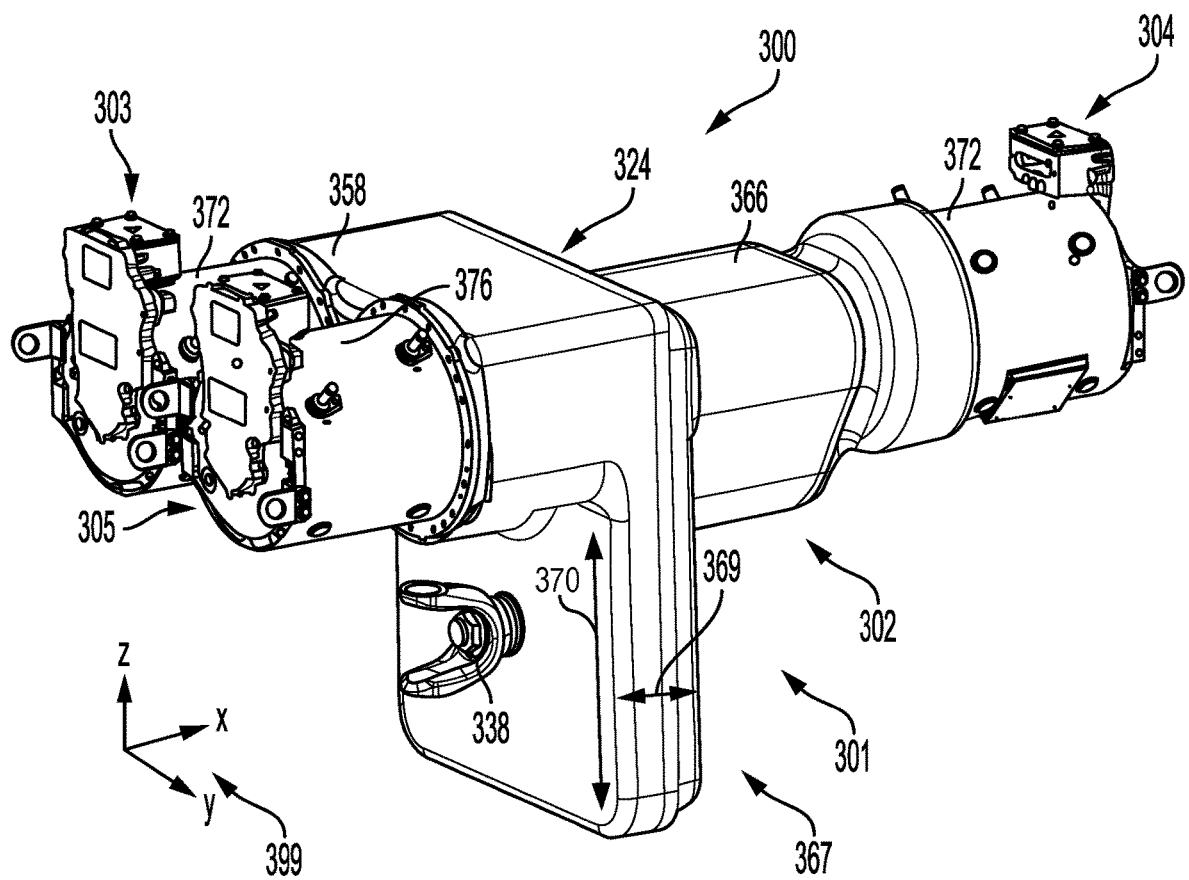
FIG. 3A shows a perspective view of a detailed illustration of the transmission system.
Figure 3B:
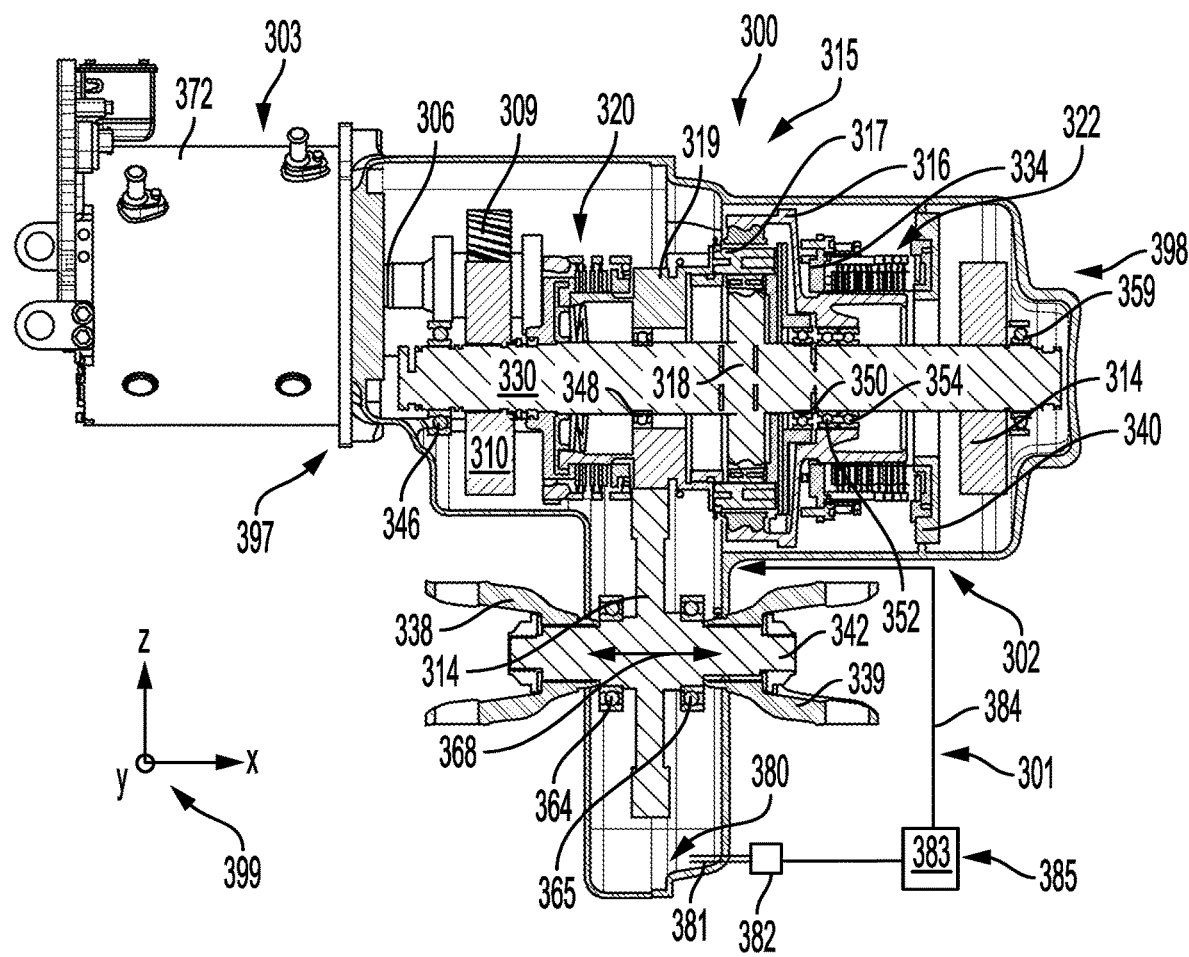
FIG. 3B shows a cross section of a lateral view of a detailed illustration of the transmission system.
Figure 3C:
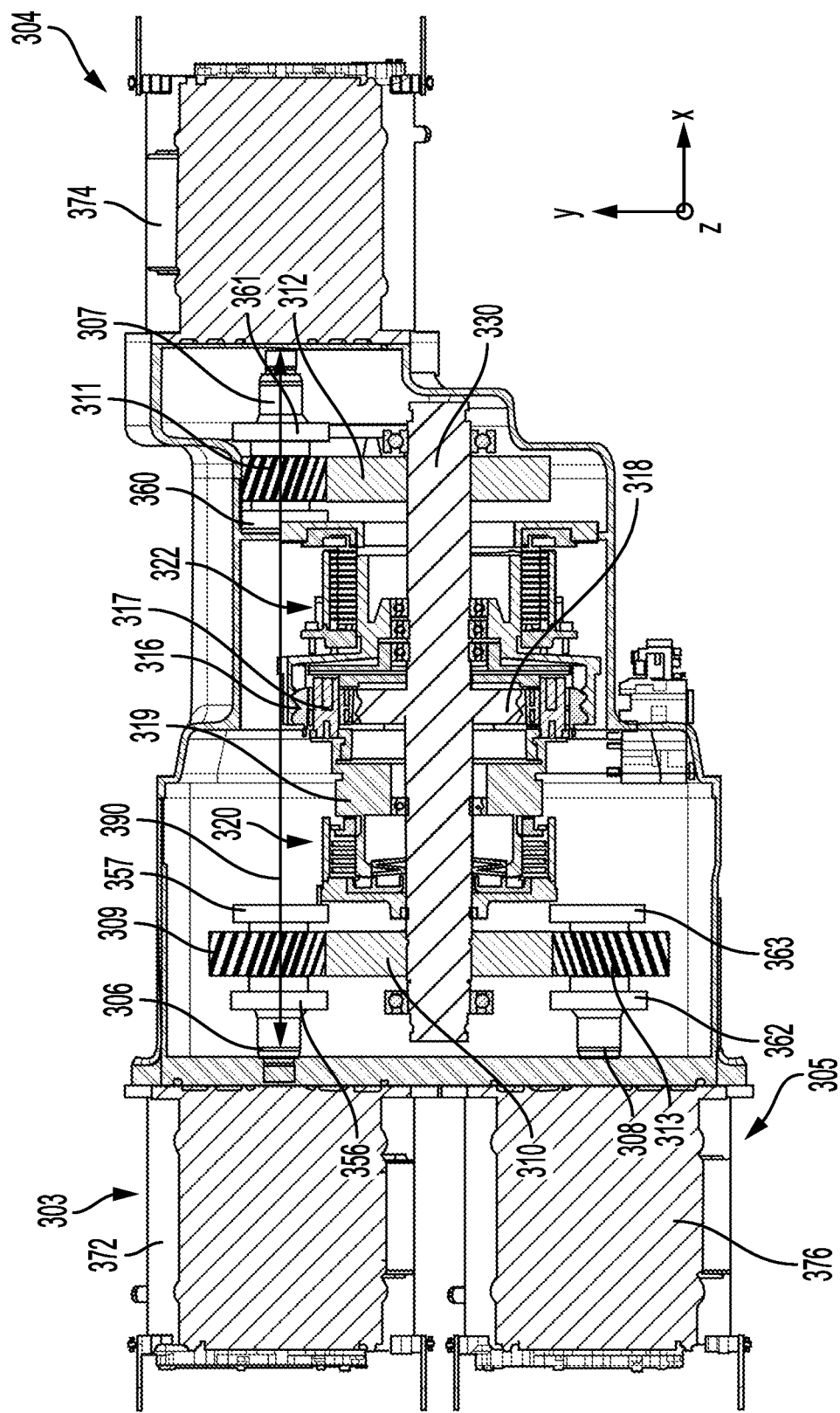
FIG. 3C shows a cross section of a top down view of a detailed illustration of the transmission system.

Referring now to FIG. 2A, a stick diagram of an exemplary transmission system 200 is shown. The transmission system 200 includes first, second, and third electric machines (e.g., first, second, and third electric motors). The first, second, and third electric machines may be configured to provide a desired amount of tractive effort at stall to load a bucket (not shown) as well as a target top speed and speed on ramp. The use of multiple motors in the electric drive unit therefore enables the unit to attain end-use performance goals.

Each of the first, second, and third electric machines may include conventional components such as rotors and stators that electromagnetically interact during operation to generate motive power. Further in one example, the electric machines may be motor-generators which are designed to generate electrical energy during regenerative operation. Still further, the electric machines may have similar designs and sizes, in some instances. In this way, manufacturing efficiency may be increased. However, the electric machines may have differing sizes and/or designs, in alternate examples.

A first electric machine 201, a second electric machine 203, and a third electric machine 205 may be electrically coupled to one or more energy storage device(s) (e.g., one or more traction batteries, capacitor(s), combinations thereof, and the like) by way of inverters. For example, first electric machine 201 is coupled to a first inverter 202, second electric machine 203 is coupled to a second invertor 204, and third electric machine 205 is coupled to a third inverter 206. These inverters and other inverters described herein are designed to convert direct current (DC) to alternating current (AC) and vice versa. In one use-case example, the electric machines 201, 203, and 205 and the respective inverters 202, 204, and 206 may be three-phase devices which can achieve greater efficiency when compared to other types of motors. However, motors and inverters designed to operate using more than three phases have been envisioned.

Further, the transmission system 200 contains a multi-speed transmission 290 that includes a plurality of gears and shafts, a planetary gear set 250, and one or more clutches. The first electric machine 201 may be coupled to a first input shaft 210 of the transmission 290. The second electric machine 203 may be coupled to a second input shaft 212 of the transmission 290. The third electric machine 205 may be coupled to a third input shaft 214 of the transmission 290. Bearing 277 and bearing 278 may support and facilitate rotation of the first input shaft 210. Bearing 279 and bearing 280 may support and facilitate rotation of the second input shaft 212. Bearing 287 and bearing 288 may support and facilitate rotation of the third input shaft 214. A bearing as described herein may include inner races, outer races, and roller elements (e.g., balls, cylindrical rollers, tapered cylindrical rollers, and the like).

The first electric machine 201 may be arranged on a first side 292 of the transmission 290. The second electric machine 203 may be arranged on a second opposing side 294 of the transmission 290. The third electric machine 205 may be arranged on the first side 292 of the transmission 290. The first and third electric machines 201, 205 may be arranged within the same longitudinal plane at different lateral axes, as will be further described. Thus, the first input shaft 210 and the third input shaft 214 may be positioned on the first side 292 of the transmission 290 and the second input shaft 212 may be positioned on the second opposing side 294. The first input shaft 210, the second input shaft 212, and the third input shaft 214 may be positioned along a horizontal axis, as will be first described, and may be parallel to each other.

In the embodiment depicted in FIG. 2A, the first input shaft 210 is rotationally coupled to a first gear 220. First gear 220 is then further rotationally coupled to a second gear 222 which is rotationally coupled to a first side of an idler shaft 216. The first side of the idler shaft 216 may correspond with the first side 292 of the transmission 290. The second input shaft 212 is rotationally coupled to a third gear 224. The third gear 224 is then further rotationally coupled to a fourth gear 226 which is rotationally coupled to a second side of the idler shaft 216. The second side of the idler shaft 216 may correspond with the second opposing side 294 of the transmission 290. The third input shaft 214 is rotationally coupled to a fifth gear 228. Fifth gear 228 is also rotationally coupled to the second gear 222. The first gear 220, the second gear 222, and the fifth gear 228 may all be aligned along a longitudinal axis and the third gear 224 and the fourth gear 226 may be aligned along a different longitudinal axis, as will be further described.

Thus, via the first input shaft 210, the second input shaft 212, and the third input shaft 214 and the first, second, third, fourth, and fifth gears 220, 222, 224, 226, and 228, the first electric machine 201, the second electric machine 203, and the third electric machine 205 may all be coupled to the idler shaft 216. The idler shaft 216 in turn may connect the first, second, and third electric machines together. A plurality of bearings may be connected to the idler shaft (e.g., bearing 281, bearing 282, bearing 283, bearing 284, bearing 285, and bearing 286) in order to support and facilitate rotation of the idler shaft 216.

The transmission 290 further includes the planetary gear set 250. The planetary gear set 250 comprises a ring gear 252, planet gears 254, and a sun gear 256. The planet gears 254 may rotate on a carrier 258. Carrier 258 may be coupled to a first clutch 230. The sun gear 256 may be rotationally coupled to the idler shaft 216 such that as the idler shaft 216 rotates based on mechanical power from any of the three electric machines, so does the sun gear 256. The sun gear 256 may be meshed with planet gears 254 and the planet gears 254 may be meshed (e.g., mechanically coupled) with the ring gear 252, thus the planet gears 254 couple the sun gear 256 to the ring gear 252. The ring gear 252 may be coupled to a second clutch 240. Depending on engagement or disengagement of the second clutch 240, the ring gear 252 may or may not rotate along with the planet gears 254 when the sun gear 256 rotates.

The planetary gear set 250 may be a simple planetary gear set that solely includes the sun gear, the ring gear, the planet gears, and the carrier. By using a simple planetary assembly, transmission compactness may be increased when compared to more complex planetary assemblies such as multi-stage planetary assemblies, Ravigneaux planetary assemblies, and the like. Consequently, the driveline system may pose less space constraints on other vehicle components. Further, losses in the transmission may be decreased when a simple planetary gear set is used as opposed to more complex gear arrangements.

The transmission 290 further includes the first clutch 230 and the second clutch 240. The first and second clutches 230, 240 are specifically illustrated as friction clutches. In some examples, the first and second clutches 230, 240 may be wet friction clutches. A friction clutch, as described herein, may include two sets of plates designed to frictionally engage and disengage one another while the clutch is open and closed, respectively. As such, the amount of torque transferred through the clutch may be modulated depending on the degree of plate engagement.

To increase system compactness, the first and second clutches, as well as the idler shaft, may be coaxially arranged. The first clutch 230 may be coupled to the idler shaft 216 and may rotate therewith during transmission operation. The first clutch 230 may include a first set of plates 234. The first set of plates 234 may specifically be included in a clutch drum 232 that is coupled to or formed with a gear of the first clutch 230. The carrier 258 of the planetary gear set 250 may be fixedly coupled to the first clutch 230 via a gear 259. To elaborate, a second set of plates 236 in the first clutch 230 may be fixedly engaged with the carrier 258. The second set of plates 236 may specifically be included a clutch hub 238 that is formed with or otherwise fixedly coupled to the carrier 258 via the gear 259. As such, the second set of plates 236, the clutch hub 238, and the carrier 258 rotate in unison. When engaged, the first clutch 230 may engage the idler shaft 216. In some examples, the first clutch 230 may be a lower gear clutch as opposed to the second clutch 240 which may be a higher gear clutch.

In some examples, a ratio may be created between the first, second, and third electric machines 201, 203, 205 and the first clutch 230, with the idler shaft 216 coupling the first clutch 230 to the electric machines. This ratio may reduce the delta speed in the first and second clutches 230, 240 and therefore may reduce drag loss.

A shaft 253 may extend from the ring gear 252 and may have the second clutch 240 residing thereon. The second clutch 240 may be designed to ground the ring gear 252. To accomplish the ring gear 252 grounding, the second clutch 240 may be fixedly attached to a stationary component, such as a housing of the transmission 290. The second clutch 240 includes a first set of plates 244 grounded to the housing of the transmission 290. The first set of plates 244 may specifically be included in a clutch drum 242 that is coupled (e.g., grounded) to the housing of the transmission 290. A second set of plates 246 in the second clutch 240 may be fixedly engaged with the ring gear 252 of the planetary gear set 250. The second set of plates 246 may be included in a clutch drum 248 that is formed with or otherwise fixedly coupled to a shaft 249, which is formed with or otherwise fixedly coupled to a shaft 253 of the ring gear 252. When the second clutch 240 is engaged, rotation of the ring gear 252 may be halted, thus creating a different ratio for the planetary gear set.

The transmission system 200 may comprise a first operating gear and a second operating gear. The transmission 290 may be in the first operating gear when the first clutch 230 is engaged and the transmission 290 may be in the second operating gear when the second clutch 240 is engaged. In the second operating gear, the ring gear 252 may be held stationary by the second clutch 240. As such, in the second operating gear, mechanical power is transferred from the first electric machine 201, the second electric machine 203, and the third electric machine 205, through the first input shaft 210, the second input shaft 212, and the third input shaft 214, respectively, to the idler shaft 216 via the first, second, third, fourth, and fifth gears 220, 222, 224, 226, 228. From the idler shaft 216, mechanical power is transferred to the sun gear 256, then to the planet gears 254, to the carrier 258, to the gear 259, to the gear 270, and finally to an output shaft 272. In the first operating gear, mechanical power is transferred from the first electric machine 201, the second electric machine 203, and the third electric machine 205 to the idler shaft 216 via the first, second, and third input shafts 210, 212, 214, respectively, and the first, second, third, fourth, and fifth gears 220, 222, 224, 226, 228. From the idler shaft 216, mechanical power is transferred into the first clutch 230, to the gear 259, to the gear 270, and finally to the output shaft 272.

The first clutch 230 and the second clutch 240 may be positioned on opposing sides of the planetary gear set 250 to allow for greater space efficiency and specifically a desired lateral width of a top section of the transmission 290. The desired lateral width may be chosen based on the type of electric vehicle in which the transmission system 200 is to be used, in one use-case scenario the electric vehicle may be a loader.

The first and second friction clutches described herein may be operated with varying amounts of engagement (e.g., continuously adjusted through the clutch's range of engagement). Further, the friction clutches described herein may be wet friction clutches through which lubricant is routed to increase clutch longevity. However, dry friction clutches may be used in alternate examples. The first clutch 230 and the second clutch 240 may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples.

The transmission 290 further includes the output shaft 272. Output shaft may be coupled to the planetary gear set 250. To elaborate, the output shaft 272 may be rotationally coupled to a gear 270 which is rotationally coupled to the carrier 258 which, as stated, is rotationally coupled to the planet gears 254 of the planetary gear set 250. Bearing 289 and bearing 291 may support and facilitate rotation of the output shaft 272.

The output shaft 272 may couple to a first flange 274 and a second flange 276. The first and second flanges 274, 276 may be designed to attach to axles (not pictured) via shafts, couplings, changes, combinations thereof, and the like. Such axles may include components such as differentials, axle shaft, and drive wheels (e.g., front vehicle wheels 156 and rear vehicle wheels 155 of FIG. 1). The output shaft 272 may be configured to transfer rotational torque to the axles. The first flange 274 may lead to a front axle and the second flange 276 may lead to a rear axle. The first flange 274 may be oriented towards the first side 292 of the transmission 290 and the second flange 276 may be oriented towards the second opposing side 294 of the transmission 290. The distance between the first flange 274 and the second flange 276 may be specified to a desired length based on the electric vehicle in which the transmission system 200 is to be used. Flanges are a type of output interface. In some examples, other types output interfaces have been contemplated such as yokes, splines, joints, combinations thereof, and the like.

FIG. 2B shows a table 299 that indicates the configurations of the first clutch 230 and the second clutch 240 in the lower gear mode and the higher gear mode. As previously indicated, in the lower gear mode, the first cultch is engaged and the second clutch is disengaged and conversely, in the higher gear mode, the first clutch is disengaged and the second clutch is engaged.

FIGS. 3A-3C depict an example of an electric drive unit 300 with a transmission system 301 that includes a transmission 302. It will be understood that the electric drive unit 300 and transmission system 301, shown in FIGS. 3A-3C, and the electric drive unit and transmission system discussed with reference to FIGS. 1 and 2A may have at least some overlapping components with regard to component structure and/or function. FIG. 3A shows a perspective view of the transmission 290 within a housing 324. FIG. 3B specifically shows a cross-sectional view where cross-sections are cut into the transmission system along a vertical axis. FIG. 3C specifically shows a cross-sectional view where cross-sections are cut into the transmission system along a horizontal axis.

An axis system 399 is provided in FIG. 3A as well as FIGS. 3B and 3C, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The electric drive unit 300 again includes a first electric machine 303, a second electric machine 304, and a third electric machine 305. The first electric machine 303 and the third electric machine 305 may be arranged on a first side 397 of the electric drive unit 300 while the second electric machine 304 may be arranged on a second side 398 of the electric drive unit 300. The transmission system 301 again includes a first input shaft 306, a second input shaft 307, and a third input shaft 308 coupled to the first electric machine 303, the second electric machine 304, and the third electric machine 305, respectively. The transmission system 301 further includes a first gear 309, a second gear 310, a third gear 311, a fourth gear 312, and a fifth gear 313. The first gear 309 rotationally couples to the first input shaft 306. The second gear 310 meshes with the first gear 309 and the fifth gear 313. The third gear 311 rotationally couples to the second input shaft 307. The fourth gear 312 meshes with the third gear 311. The fifth gear 313 rotationally couples to the third input shaft 308. The second gear 310 and the fourth gear 312 both rotationally couple to an idler shaft 330. To achieve the couplings between the gears and the shafts as laid out above, the gears may be formed on the shafts via machining or attached to the shafts via splines and/or welds, for instance. In this way, the gears and shafts rotate in unison during transmission operation. The ratio of the first gear 309, the second gear 310, the third gear 311, the fourth gear 312, and the fifth gear 313 may be a relatively high ratio to reduce the delta speed in a first clutch 320, thereby reducing drag loss. Input reduction is dependent on prime mover (e.g., electric motor) speed, for example if an electric motor is used at high speed, reduction ratio may be higher. As an example, the ratio may be 1.692:2.79:1.5, wherein 1.692 is input, 2.79 is at the planetary, and 1.5 is the output. Hence a reduction from 1.692 at input to 1.5 at output is seen in one example. However, other suitable transmission operating gear ratios have been contemplate, for example the ratios may be selected based on a number of factors such as motor speed range, expected motor load, vehicle weight, and the like.

An axial distance 368 between a first flange 338 and a second flange 339 is less than an axial distance 390 between the first electric machine 303 and the second electric machine 304. This decreased axial width in relation to the output allows the electric drive unit to be effectively packaged in certain vehicles that, for example, have stringent demands with regard to the size of the output shaft such as a loader type vehicle. For example, the axial distance 368 between the first flange 338 and the second flange 339 may be configured to be less than the reduced width 369 of the lower section 367 of the housing 324. The use of only one gear 314 on the output shaft 342, that is enabled by the upstream clutch and gearing arrangement, allows this reduced width to be achieved while maintaining multiple operational transmission ratios.

Additionally, the gear 314 may be configured with a diameter to fit the drop height 370 of the lower section 367 of the housing 324. The drop height 370 may be configured for a specific desired vehicle platform, such as a loader, wherein a relatively long drop away from the first and second sections 358, 366 of the housing 324 is demanded based on constraints from other components. Thus, the output shaft 342 may be installed within the housing 324 with the axial distance 368 between the flanges as described and the output shaft 342 may be installed within the housing 324 spaced away from the first and second sections 358, 366 per the configuration of the gear 314.

Bearing 356 and bearing 357 are coupled to opposing sides of the first input shaft 306 and may be mounted in sections of the housing 324 to enable efficient installation. Bearing 360 and bearing 361 are coupled to opposing sides of the second input shaft 307 and may be mounted in sections of the housing 324 to enable efficient installation. Bearing 362 and bearing 363 are coupled to opposing sides of the third input shaft 308 and may be mounted in sections of the housing 324 to enable efficient installation. Bearing 364 and bearing 365 are coupled to opposing sides of an output shaft 342 to support and facilitate rotation of the output shaft 342. Bearings 364, 365 are positioned outboard from gear 314 but inboard from the first and second flanges 338, 339. A plurality of bearings may support and facilitate rotation of the idler shaft 330, including bearing 346, bearing 348, bearing 350, bearing 352, bearing 354, and bearing 359, as illustrated in FIGS. 3B and 3C.

The transmission 302 further includes the first clutch 320, a second clutch 322, and a planetary gear set 315. As described previously, the planetary gear set includes a ring gear 316, planet gears 317, and a sun gear 318. The planet gears 317 may rotate on a carrier 319. The first clutch 320 is designed to selectively couple to the carrier 319 when engaged. The second clutch 322 is designed to selectively couple to the ring gear 316 when engaged. The second clutch 322 may be grounded to a portion 340 of the housing 324. In some embodiments, the ring gear 316 may be coupled to the second clutch 322 via a synchronizer 334. In such embodiments, the synchronizer 334 may permit a portion of a shaft of the second clutch 322 to be disconnected from the second clutch 322 and freely rotate while the transmission system is in first gear. As such, plates of the second clutch 322 may not rotate when the synchronizer is disengaged. As described, the transmission 302 further includes the output shaft 342 which is coupled to the planetary gear set 315 via the gear 314 and the carrier 319. The output shaft 342 is rotationally coupled to the gear 314 and the gear 314 is directly coupled to the carrier 319. As described, the carrier is coupled to and supports the planet gears 317 of the planetary gear set 315.

In some examples, as depicted in FIGS. 3B-3C, the idler shaft 330 is oriented along the horizontal axis of axis 399. The output shaft 342 is similarly oriented along the horizontal axis. As illustrated, the output shaft 342 is positioned vertically below the idler shaft 330, allowing the transmission to attain a targeted drop as well as operating gear ratio values based on the position of the clutches. The first electric machine 303 and the third electric machine 305 may be positioned in the same longitudinal axis as each other and may be positioned higher with respect to gravity than the idler shaft 330. The first electric machine 303 and the second electric machine 304 may be positioned in the same horizontal axis but may or may not be arranged at the same position with respect to the vertical axis of axis 399.

The electric drive unit 300 may further include a lubrication system 385 with a scavenger pump 382. The scavenger pump 382 includes a pick-up 381 positioned in a sump 380 in the housing 324. As such, the pick-up 381 may be positioned vertically below the gear 314. In this way, the lubrication system 385 removes lubricant (e.g., oil) from the transmission 302 during operation, thereby reducing churning losses. As depicted, the scavenger pump 382 is positioned external to the housing 324 of the transmission 302. However, lubrication system layouts with the scavenger pump positioned within the housing have been envisioned.

The lubrication system 385 may further include a reservoir 383 as well as other components such as filters, additional pumps, conduits, spray nozzles, and the like. As such, the lubrication system 385 may deliver lubricant to transmission components such as clutches, bearings, and/or other rotating components, as denoted by arrow 384.

The housing 324 is illustrated as a split housing that includes a first section 358 and a second section 366. However, other suitable housing designs may be used in other examples such as three or four piece housing designs. The first section 358 encloses and supports bearings on the left side of the transmission (in the frame of reference of FIGS. 3A-3C) while the second section 366 encloses and supports bearings on the right side of the transmission. Due to the decreased axial width of the output shaft 342 in comparison to the idler shaft 330, a lower section 367 of the housing has a reduced width 369 and a drop height 370. The housing 324 of the transmission 302 is further coupled to a first electric machine enclosure 372 of the first electric machine 303, a second electric machine enclosure 374 of the second electric machine 304, and a third electric machine enclosure 376 of the third electric machine 305. Electrical interfaces (not shown) such as bus bars may be included in the electrical machines.

Rotational axes of the first input shaft 306, the second input shaft 307, and the third input shaft 308 may be parallel to the rotational axis of the idler shaft 330. Rotational axes of the first gear 309, the second gear 310, the third gear 311, the fourth gear 312, and the fifth gear 313 may be parallel to each other and perpendicular to the rotational axes of the first input shaft 306, the second input shaft 307, the third input shaft 308, the idler shaft 330, and the output shaft 342. The rotational axis of the output shaft 342 may be coaxial to rotational axes of the first and second flanges 338, 339.

Figure 4:
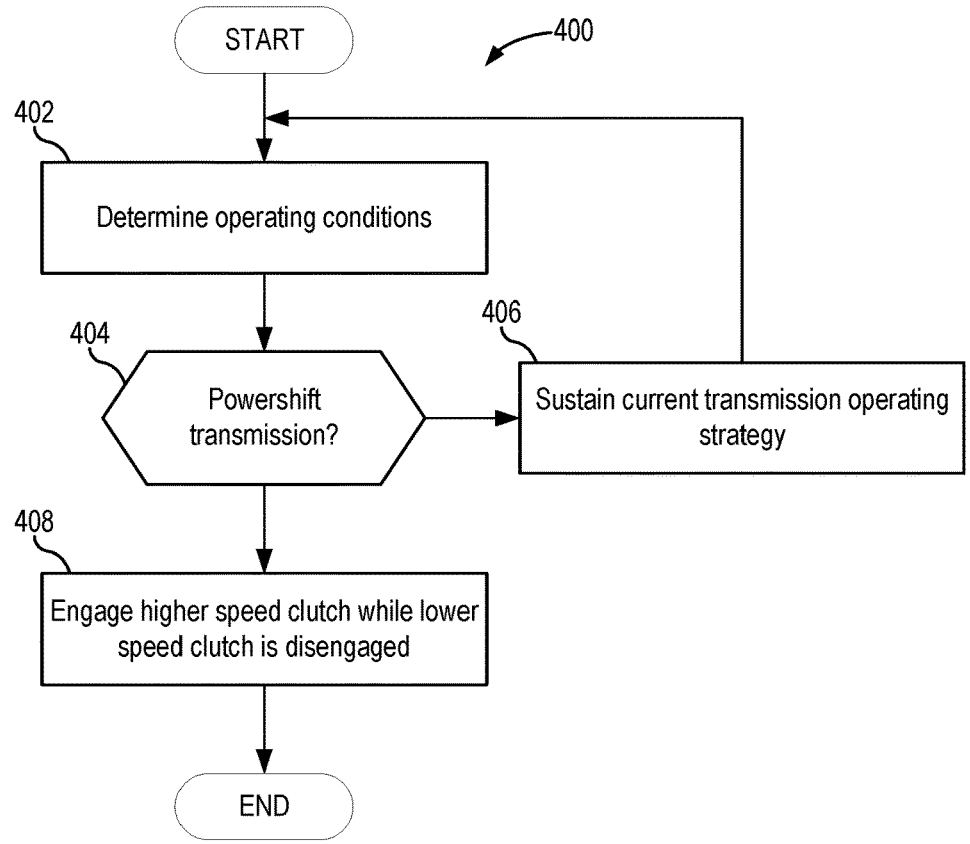
FIG. 4 is a flowchart depicting a method of operation for a two-speed transmission in an electric vehicle.

Referring now to FIG. 4, a method 400 for operation of a transmission system is shown. The method 400 may be carried out by any of the transmission systems or combinations of the transmission system described herein with regard to FIGS. 1-3C. However, the method 400 may be carried via other suitable transmissions, in other examples. Furthermore, the method 400 may be implemented by a controller that includes a process and memory, as previously discussed.

At 402, the method 400 includes determining operating conditions. The operating conditions may include input device position (e.g., gearshift lever position), clutch configuration, transmission speed, motor speed, vehicle speed, vehicle load, ambient temperature, and the like. The operating conditions may be ascertained via sensor inputs, modeling, look-up tables, and other suitable techniques.

Next at 404, the method 400 includes judging if a powershift in the transmission should be implemented for selective engagement or disengagement of either a first friction clutch or a second friction clutch. Such as determination may be carried out responsive to vehicle speed surpassing a threshold value, in one example. In other examples, operator interaction with gear selector may initiate powershift operation.

If it is determined that a powershift should not occur (NO at 404) the method proceeds to 406 where the method 400 includes sustaining the current transmission operating strategy. For instance, the transmission may be maintained in a lower gear.

Conversely, if it is determined that a powershift should occur (YES at 404) the method moves to 408 where the method 400 includes engaging a higher speed clutch while disengaging a lower speed clutch while power delivery from both electric machines to the transmission is sustained to transition from a lower gear (e.g., a first operating gear) to a higher gear (e.g., a second operating gear). In this way, the shift may occur with little or no power interruption, if wanted.

Figure 5:
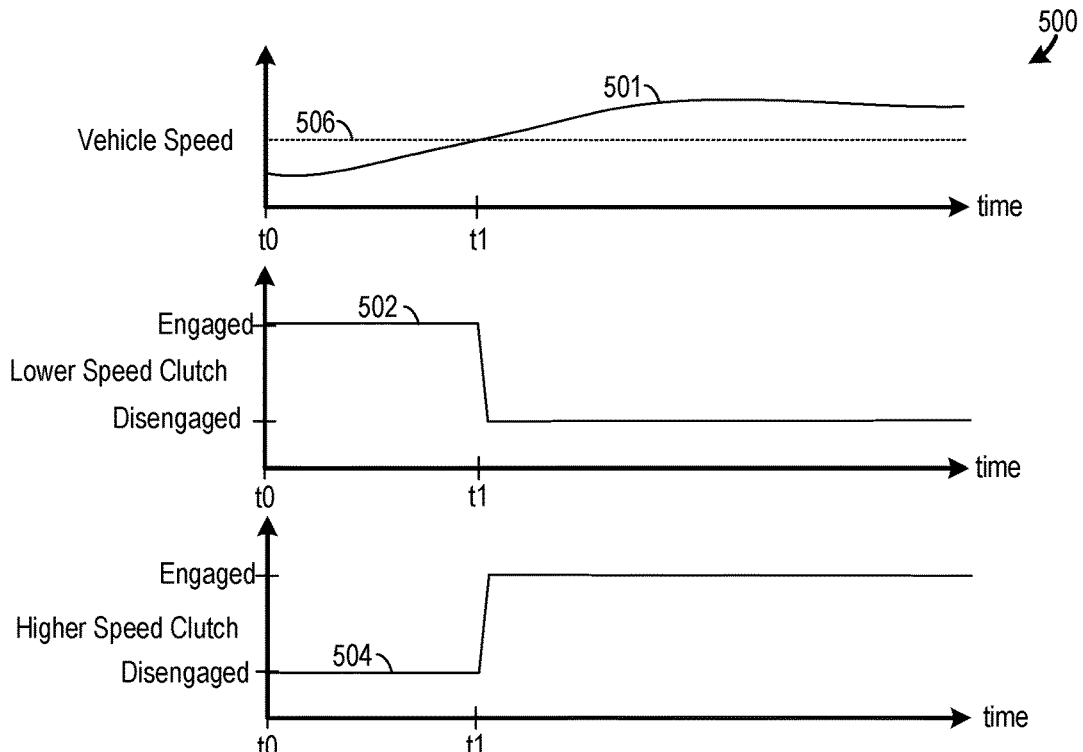
FIG. 5 is a timing diagram for a use-case transmission control strategy.

FIG. 5 illustrates a timing diagram 500 of a use-case control strategy for a transmission system, such as any of the previously described transmissions or combinations of the transmissions. In each graph, time is indicated on the abscissa and increases from left to right. The ordinate for plot 501 indicates vehicle speed. The ordinates for plots 502 and 504 indicate the operational states ("Engaged" and "Disengaged") of the lower and higher speed clutches.

From t0 to t1 the vehicle speed increases and at t1 the speed surpasses a threshold value 506. Responsive to the vehicle speed surpassing the threshold value a powershifting event occurs where the lower speed clutch transitions into a disengaged state and the higher speed clutch transitions into an engaged state. It will be understood that the specific clutch control strategy may be more nuanced, in practice. For instance, clutch pressure in the second clutch may be less abruptly ramped up to allow a smoother transition into the second gear to occur and reduce the likelihood of unwanted noise, vibration, and harshness (NVH).

The technical effect of the transmission systems and operating methods herein is to efficiently transition between the transmission's discrete gears with a decreased amount of power interruption and/or provide a technique which allows the transmission to achieve a higher gear ratio for lower speed operation and a lower gear ratio for higher speed operation in a space efficient package.

The disclosure also provides support for a transmission system of an electric drive unit, comprising: a first input shaft rotationally coupled to a first electric machine, a second input shaft rotationally coupled to a second electric machine, a third input shaft rotationally coupled to a third electric machine, wherein the first electric machine, the second electric machine, and the third electric machine are connected via an idler shaft, and a planetary gear set coupled to the idler shaft and positioned between and coupled to a first clutch and a second clutch. In a first example of the system, the system further comprises: a first gear coupled to the first input shaft, a second gear coupled to the first gear and to the idler shaft, a third gear coupled to the second input shaft, a fourth gear coupled to the third gear and to the idler shaft, and a fifth gear coupled to the third input shaft and to the second gear. In a second example of the system, optionally including the first example, a sun gear of the planetary gear set is coupled to the idler shaft. In a third example of the system, optionally including one or both of the first and second examples, the first clutch and the second clutch are configured to shift the transmission system between multiple gear ratios. In a fourth example of the system, optionally including one or more or each of the first through third examples, the first clutch, when engaged, is configured to engage the idler shaft. In a fifth example of the system, optionally including one or more or each of the first through fourth examples, the second clutch, when engaged, is configured to engage a ring gear of the planetary gear set, the second clutch grounding the ring gear when engaged. In a sixth example of the system, optionally including one or more or each of the first through fifth examples, the first electric machine is positioned on a first side of the transmission system and the second electric machine is positioned on a second opposing side of the transmission system. In a seventh example of the system, optionally including one or more or each of the first through sixth examples, the third electric machine is positioned on the first side of the transmission system, wherein the first electric machine and the third electric machine are positioned in a longitudinal plane at different lateral axes in the longitudinal plane. In a eighth example of the system, optionally including one or more or each of the first through seventh examples, the system further comprises: an output shaft coupled to the planetary gear set via a gear wherein the output shaft transfers rotational torque to outputs coupled to the output shaft via flanges. In a ninth example of the system, optionally including one or more or each of the first through eighth examples, the first clutch and the second clutch are wet friction clutches. The disclosure also provides support for a method for operation of a transmission system, comprising: transitioning between a first operating gear and a second operating gear via selective engagement and disengagement of a first friction clutch and a second friction clutch, wherein the transmission system includes: a first input shaft coupled to a first electric machine, a second input shaft coupled to a second electric machine, a third input shaft coupled to a third electric machine, a planetary gear set arranged between the first friction clutch and the second friction clutch, and an output shaft coupled to the planetary gear set via a gear, and transferring mechanical power from one of the first and second friction clutches to the output shaft that is spaced away from the planetary gear set. In a first example of the method, transitioning between the first operating gear and the second operating gear includes engaging the first friction clutch while disengaging the second friction clutch to shift from the second operating gear to the first operating gear. In a second example of the method, optionally including the first example, transitioning between the first operating gear and the second operating gear includes engaging the second friction clutch while disengaging the first friction clutch to shift from the first operating gear to the second operating gear. In a third example of the method, optionally including one or both of the first and second examples, the method further comprises: transferring mechanical power from three electric machines to the output shaft. The disclosure also provides support for an electric drive unit for an electric vehicle, comprising: a transmission system comprising: a first input shaft coupled to a first electric machine, a second input shaft coupled to a second electric machine, a third input shaft coupled to a third electric machine, wherein the first, second, and third electric machines are connected via an idler shaft, a planetary gear set coupled to the idler shaft and arranged between a lower gear clutch and a higher gear clutch, and an output shaft coupled to the planetary gear set via a gear. In a first example of the system, the output shaft is spaced away from the planetary gear set via the gear, the gear being shaped and sized for installation into a housing of the transmission system, where the housing of the transmission system has a shape and size configured for a desired vehicle platform. In a second example of the system, optionally including the first example, the output shaft includes two flanges and two bearings and a distance between the two flanges is configured for installation into the housing of the transmission system. In a third example of the system, optionally including one or both of the first and second examples: the lower gear clutch is configured to engage the idler shaft, the higher gear clutch is configured to engage and ground a ring gear of the planetary gear set, and the idler shaft couples the first electric machine, the second electric machine, and the third electric machine via a plurality of gears. In a fourth example of the system, optionally including one or more or each of the first through third examples, the lower gear clutch and the higher gear clutch are wet friction clutches. In a fifth example of the system, optionally including one or more or each of the first through fourth examples, the first, second, and third electric machines are configured to drive the electric vehicle.

FIGS. 3A-3C are drawn approximately to scale. Although other relative component dimensions may be used, in other embodiments.

FIGS. 1-2A and 3A-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system of an electric drive unit, comprising:
a first input shaft rotationally coupled to a first electric machine;
a second input shaft rotationally coupled to a second electric machine;
a third input shaft rotationally coupled to a third electric machine;

wherein the first electric machine, the second electric machine, and the third electric machine are connected via an idler shaft; and a planetary gear set coupled to the idler shaft and positioned between and coupled to a first clutch and a second clutch;

wherein the second clutch, when engaged, is configured to engage and ground a ring gear of the planetary gear set.

2. The transmission system of claim 1, further comprising:

a first gear coupled to the first input shaft;

a second gear coupled to the first gear and to the idler shaft;

a third gear coupled to the second input shaft;

a fourth gear coupled to the third gear and to the idler shaft; and a fifth gear coupled to the third input shaft and to the second gear.

3. The transmission system of claim 1, wherein a sun gear of the planetary gear set is coupled to the idler shaft.

4. The transmission system of claim 1, wherein the first clutch and the second clutch are configured to shift the transmission system between multiple gear ratios.

5. The transmission system of claim 1, wherein the first clutch, when engaged, is configured to rotationally couple a carrier in the planetary gear set and the idler shaft.

6. The transmission system of claim 1, wherein the first electric machine is positioned on a first side of the transmission system and the second electric machine is positioned on a second, opposing side of the transmission system.

7. The transmission system of claim 6, wherein the third electric machine is positioned on the first side of the transmission system, and wherein the first electric machine and the third electric machine are positioned in a longitudinal plane at different lateral axes in the longitudinal plane.

8. The transmission system of claim 1, further comprising an output shaft coupled to the planetary gear set via a gear, wherein the output shaft transfers rotational torque to outputs coupled to the output shaft via flanges.

9. The transmission system of claim 1, wherein the first clutch and the second clutch are wet friction clutches.

10. A method for operation of a transmission system, comprising:

transitioning between a first operating gear and a second operating gear via selective engagement and disengagement of a first friction clutch and a second friction clutch;

wherein the transmission system includes:
 a first input shaft coupled to a first electric machine;
 a second input shaft coupled to a second electric machine;
 a third input shaft coupled to a third electric machine;
 a planetary gear set arranged between the first friction clutch and the second friction clutch; and
 an output shaft coupled to the planetary gear set via a gear;

transferring mechanical power from one of the first and second friction clutches to the output shaft that is spaced away from the planetary gear set; and grounding a ring gear in the planetary gear set via engagement of the second friction clutch;

wherein the first electric machine, the second electric machine, and the third electric machine are connected via an idler shaft; and wherein the planetary gear set is coupled to the idler shaft and positioned between and coupled to the first friction clutch and the second friction clutch.

11. The method of claim 10, wherein transitioning between the first operating gear and the second operating gear includes engaging the first friction clutch while disengaging the second friction clutch to shift from the second operating gear to the first operating gear.

12. The method of claim 10, wherein transitioning between the first operating gear and the second operating gear includes engaging the second friction clutch while disengaging the first friction clutch to shift from the first operating gear to the second operating gear.

13. The method of claim 10, further comprising transferring mechanical power from three electric machines to the output shaft.

14. An electric drive unit for an electric vehicle, comprising:

a transmission system comprising:
 a first input shaft coupled to a first electric machine;
 a second input shaft coupled to a second electric machine;
 a third input shaft coupled to a third electric machine;
 wherein the first, second, and third electric machines are connected via an idler shaft;
 a planetary gear set coupled to the idler shaft and arranged between a lower gear clutch and a higher gear clutch; and
 an output shaft coupled to the planetary gear set via a gear;

wherein:
 the lower gear clutch is configured to engage the idler shaft;
 the higher gear clutch is configured to engage and ground a ring gear of the planetary gear set; and
 the idler shaft couples the first electric machine, the second electric machine, and the third electric machine via a plurality of gears.

15. The electric drive unit of claim 14, wherein the output shaft is spaced away from the planetary gear set via the gear, the gear being shaped and sized for installation into a housing of the transmission system, and wherein the housing of the transmission system has a shape and size configured for a desired vehicle platform.

16. The electric drive unit of claim 15, wherein the output shaft includes two flanges and two bearings and a distance between the two flanges is configured for installation into the housing of the transmission system.

17. The electric drive unit of claim 15, wherein the lower gear clutch and the higher gear clutch are wet friction clutches.

18. The electric drive unit of claim 14, wherein the first, second, and third electric machines are configured to drive the electric vehicle.

\* \* \* \* \*